United States Patent
Zhao et al.

(10) Patent No.: US 9,473,835 B2
(45) Date of Patent: Oct. 18, 2016

(54) OPTICAL MODULE AND OPTICAL DEVICE APPLICABLE TO OPTICAL MODULE

(71) Applicants: HISENSE BROADBAND MULTIMEDIA TECHNOLOGIES CO., LTD, Shandong (CN); ZTE CORPORATION, Guangdong (CN)

(72) Inventors: Qisheng Zhao, Shandong (CN); Qiang Zhang, Shandong (CN); Dengshan Xue, Shandong (CN); Songlin Zhu, Guangdong (CN); Yong Guo, Guangdong (CN); Yongjia Yin, Guangdong (CN); Sigeng Yang, Shandong (CN)

(73) Assignees: HISENSE BROADBAND MULTIMEDIA TECHNOLOGIES, LTD. (VG); HISENSE USA CORPORATION, Suwanee, GA (US); HISENSE INTERNATIONAL CO., LTD., Qingdao, Shandong (CN)

( * ) Notice: Subject to any disclaimer, the term of this patent is extended or adjusted under 35 U.S.C. 154(b) by 0 days.

(21) Appl. No.: 14/419,811

(22) PCT Filed: Nov. 20, 2012

(86) PCT No.: PCT/CN2012/084900
§ 371 (c)(1),
(2) Date: Feb. 5, 2015

(87) PCT Pub. No.: WO2014/071656
PCT Pub. Date: May 15, 2014

(65) Prior Publication Data
US 2015/0350754 A1 Dec. 3, 2015

(30) Foreign Application Priority Data
Nov. 8, 2012 (CN) .......................... 2012 1 0444187

(51) Int. Cl.
*G02B 6/42* (2006.01)
*H04B 10/25* (2013.01)
(Continued)

(52) U.S. Cl.
CPC .......... *H04Q 11/0067* (2013.01); *G02B 5/208* (2013.01); *G02B 5/26* (2013.01);
(Continued)

(58) Field of Classification Search
CPC ................ H04Q 11/0067; H04Q 2011/0009; H04Q 2011/0016; G02B 5/26; G02B 1/11; G02B 5/208; G02B 6/4246; H04J 14/02; H04B 10/2503; H04B 10/40
See application file for complete search history.

(56) References Cited

U.S. PATENT DOCUMENTS 5,917,626 A * 6/1999 Lee ...................... G02B 6/2937
 385/24
6,084,994 A * 7/2000 Li ....................... G02B 6/2937
 385/31

(Continued)

FOREIGN PATENT DOCUMENTS

CN 1617000 5/2005
CN 101900858 12/2010

(Continued)

OTHER PUBLICATIONS

PCT International Search Report, PCT/CN2012/084900, and English translation, dated Aug. 15, 2013.

*Primary Examiner* — Leslie Pascal
(74) *Attorney, Agent, or Firm* — Boyle Fredrickson, S.C.

(57) ABSTRACT

An optical module and an optical device applicable to the optical module, wherein the optical module includes a laser emission unit, a laser reception unit, a video detector and an optical assembly, the optical assembly including: a bandpass device F1 with a small-angle incidence filter sheet, wherein among optical signals transmitted to F1 via a common port of F1, the optical signal in a first optical wavelength band is passed by the small-angle incidence filter sheet and output to the video detector via the passing port thereof; and the optical signals in other bands are reflected by the small-angle incidence filter sheet and output via the reflection port thereof; a filter sheet F2 configured to pass the optical signal emitted by the laser emission unit to the reflection port of F1 and to reflect the optical signal, received by the laser reception unit, output via the reflection port of F1.

14 Claims, 4 Drawing Sheets

(51) Int. Cl.
*H04Q 11/00* (2006.01)
*G02B 5/26* (2006.01)
*G02B 5/20* (2006.01)
*H04J 14/02* (2006.01)
*H04B 10/40* (2013.01)
*G02B 1/11* (2015.01)

(52) U.S. Cl.
CPC ....... *G02B 6/4246* (2013.01); *H04B 10/2503* (2013.01); *H04B 10/40* (2013.01); *H04J 14/02* (2013.01); *G02B 1/11* (2013.01); *H04Q 2011/0009* (2013.01); *H04Q 2011/0016* (2013.01)

(56) References Cited

U.S. PATENT DOCUMENTS

| | | | |
|---|---|---|---|
| 6,389,188 B1* | 5/2002 | Scobey | G02B 6/29362 385/16 |
| 6,684,012 B2 | 1/2004 | Kimura | |
| 6,760,510 B2* | 7/2004 | Kimura | G02B 6/4246 385/24 |
| 7,290,942 B2 | 11/2007 | Kuhara et al. | |
| 2005/0008281 A1* | 1/2005 | Higuchi | G02B 6/12007 385/14 |
| 2005/0074213 A1* | 4/2005 | Lin et al. | G02B 6/29362 385/88 |
| 2008/0301595 A1* | 12/2008 | Thiyagarajan | H01S 5/12 716/132 |
| 2011/0280514 A1* | 11/2011 | Omura | G02B 6/29361 385/27 |
| 2013/0044985 A1* | 2/2013 | Teo | G02B 6/4201 385/92 |
| 2013/0077978 A1* | 3/2013 | Duis | H04B 10/14 398/139 |
| 2013/0084070 A1* | 4/2013 | Ho | G02B 6/4204 398/68 |
| 2013/0294766 A1* | 11/2013 | Cai | H04B 10/07953 398/26 |

FOREIGN PATENT DOCUMENTS

| | | | | |
|---|---|---|---|---|
| CN | 101995618 | | 3/2011 | |
| DE | GB 2301249 A | * | 11/1996 | ......... G02B 6/29368 |
| JP | 2001-215368 | | 8/2001 | |
| JP | 2011-043733 | * | 3/2011 | |

* cited by examiner

OPTICAL MODULE AND OPTICAL DEVICE APPLICABLE TO OPTICAL MODULE

CROSS-REFERENCE TO RELATED APPLICATIONS

The present application claims priority to and is a continuation of International Patent Application PCT/CN2012/084900, which claims priority to Chinese Patent Application No. 201210444187.5, filed on Nov. 8, 2012 in the People's Republic of China, entitled "OPTICAL MODULE AND OPTICAL DEVICE APPLICABLE TO OPTICAL MODULE".

BACKGROUND

The present disclosure relates to the field of optical fiber communications and particularly to an optical module and an optical device applicable to the optical module.

Along with a constantly growing demand of users for high-definition Internet Protocol Television (IPTV), video supervision and other high-bandwidth services, there are higher requirements upon an optical access network, based upon the integration of three networks, over which data information and video information may be transported concurrently, in terms of a bandwidth, a service support capability, functions and performances of access node devices, etc., especially in Fiber to The Building (FTTB) and Fiber to The Node (FTTN) scenarios.

At present an Optical Network Unit (ONU) applicable in a Gigabit Passive Optical Network (GPON) or Ethernet Passive Optical Network (EPON) system based upon the integration of three networks includes an ONU optical module and an ONU system device connected therewith.

Recently, the second stage of Next Generation-Passive Optical Network (NG-PON2) has been proposed by a telecommunication group research as another optical access network system to enhance the performance of broadband access networks.

SUMMARY

At one aspect, one or more embodiments of the disclosure provide an optical module including a laser emission unit, a laser reception unit and a video detector, wherein the optical module further includes an optical assembly including:

a band-pass device F1 arranged with a small-angle incidence filter sheet, including a common port, a passing port and a reflection port, wherein among optical signals transmitted to the band-pass device F1 via the common port over an optical fiber connected with the optical module, the optical signal in a first optical wavelength band is passed by the small-angle incidence filter sheet and then output to the video detector via the passing port; and the optical signals in other bands are reflected by the small-angle incidence filter sheet and then output via the reflection port;

a filter sheet F2 configured to pass the optical signal in a second optical wavelength band emitted by the laser emission unit to the reflection port of the band-pass device F1 and to reflect the optical signal in a third optical wavelength band among the optical signals output via the reflection port of the band-pass device F1 to the laser reception unit; and the band-pass device F1 is further configured to reflect the optical signal in the second optical wavelength band, emitted into the reflection port thereof, to the common port thereof through the small-angle incidence filter sheet and to output the optical signal to the optical fiber via the common port thereof; and wherein the second optical wavelength band is an optical wavelength band of an uplink optical data signal emitted by the optical module, the third optical wavelength band is an optical wavelength band of a downlink optical data signal received by the optical module, and the first optical wavelength band includes the optical wavelength band of a radio frequency signal received by the optical module but does not include the optical wavelength bands of the uplink optical data signal and the downlink optical data signal.

At another aspect, one or more embodiments of the disclosure provide an optical device applicable to an optical module, including:

a band-pass device F1 arranged with a small-angle incidence filter sheet, including a common port, a passing port and a reflection port, wherein among optical signals transmitted to the band-pass device F1 via the common port over an optical fiber connected with the optical module, the optical signal in a first optical wavelength band is passed by the small-angle incidence filter sheet and then output to the video detector via a passing port in the optical module; and the optical signals in other bands are reflected by the small-angle incidence filter sheet and then output via the reflection port;

a filter sheet F2 configured to pass the optical signal in a second optical wavelength band emitted by the laser emission unit in the optical module to the reflection port of the band-pass device F1 and to reflect the optical signal in a third optical wavelength band among the optical signals output via the reflection port of the band-pass device F1 to a laser reception unit in the optical module; and the band-pass device F1 is further configured to reflect the optical signal in the second optical wavelength band, emitted into the reflection port thereof, to the common port thereof through the small-angle incidence filter sheet and to output the optical signal to the optical fiber via the common port thereof.

Furthermore the optical device further includes:

a filter sheet F3 with an anti-reflection film for the third optical wavelength band, arranged between the filter sheet F2 and the laser reception unit; and a filter sheet F4 with an anti-reflection film for a fourth optical wavelength band, arranged between the passing port of the band-pass device F1 and the video detector, wherein the fourth optical wavelength band is the optical wavelength band of the radio frequency signal and located in the first optical wavelength band, or the first optical wavelength band is the same as the fourth optical wavelength band; and wherein the second optical wavelength band is an optical wavelength band of an uplink optical data signal emitted by the optical module, the third optical wavelength band is an optical wavelength band of a downlink optical data signal received by the optical module, and the first optical wavelength band includes the optical wavelength band of a radio frequency signal received by the optical module but does not include the optical wavelength bands of the uplink optical data signal and the downlink optical data signal; and the fourth optical wavelength band is the optical wavelength band of the radio frequency signal.

DETAILED DESCRIPTION

In order to make the objects, technical solutions and advantages of one or more embodiment of the disclosure more clear and apparent, the disclosure will be described below in further details with reference to the drawings. However it shall be noted that numerous details are listed in the description merely for the purpose of enabling the readers to understand one or more aspects of the disclosure, but these aspects of the disclosure may be embodied without these details.

The terms "module", "system", etc., used in this application are intended to encompass entities related to a computer, e.g., but not limited to hardware, firmware, a combination of hardware and software, software or software being executed. For example, a module may be but will not be limited to a process being run on a processor, a processor, an object, an executable process, a thread being executed, a program and/or a computer.

Figure 1:
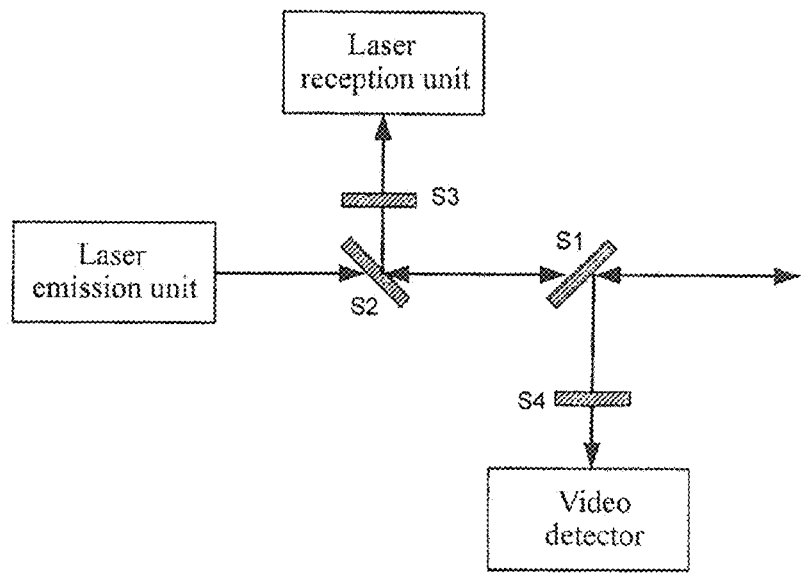
FIG. 1 is a schematic diagram of an internal structure of an optical module in the related art.

FIG. 1 illustrates an internal structure of the ONU optical module in the GPON network for the integration of three networks, and an operating principle thereof may be as follows:

A consecutive downlink optical signal at 1490 nm up to 2.488 Gbps and a radio frequency optical signal at 1550 nm transmitted by a central office (CO) to the user end are split by a 45° filter sheet S1 in the optical module so that the optical signal at 1490 nm is passed by the filter sheet S1, reflected by a filter sheet S2 and passed by a filter sheet S3 into a laser reception unit; and the radio frequency optical signal at 1550 nm is reflected by S1 and passed by S4 into a video detector;

Burst uplink emission laser at 1310 nm up to 1.2488 Gbps is emitted by a laser emission unit as an uplink optical signal passed by S2 and S1 into an Optical Distribution Network (ODN) and transported to the central office.

The laser reception unit in the optical module converts the incoming optical signal into a corresponding electric signal which is then output to the ONU system device for processing by the ONU system device;

The laser emission unit in the optical module receives an electronic signal transmitted by the ONU system device and then converts the received electronic signal into a corresponding optical signal at 1310 nm as an uplink optical signal for transmission.

The video detector receives and then converts the radio frequency optical signal into a corresponding electric signal and processes and then transports the electric signal to the ONU system device.

Based upon the foregoing recognition above of the optical module in the related art, a band-pass device arranged with a small-angle incidence filter sheet may be adopted in an optical module according to one or more embodiment of the disclosure to band-pass a radio frequency signal while reflecting optical signals in other bands, so that the radio frequency signal and the data signals in the closely spaced bands may be separated and thus the optical module may be applied to a larger number of optical access network systems, for example, to GPON and EPON systems and also to an NG-PON2 system. In the disclosure, "band-pass" refers to passing of an optical signal at a specific wavelength while stopping an optical signal at a wavelength above or below the specific wavelength.

Figure 2:
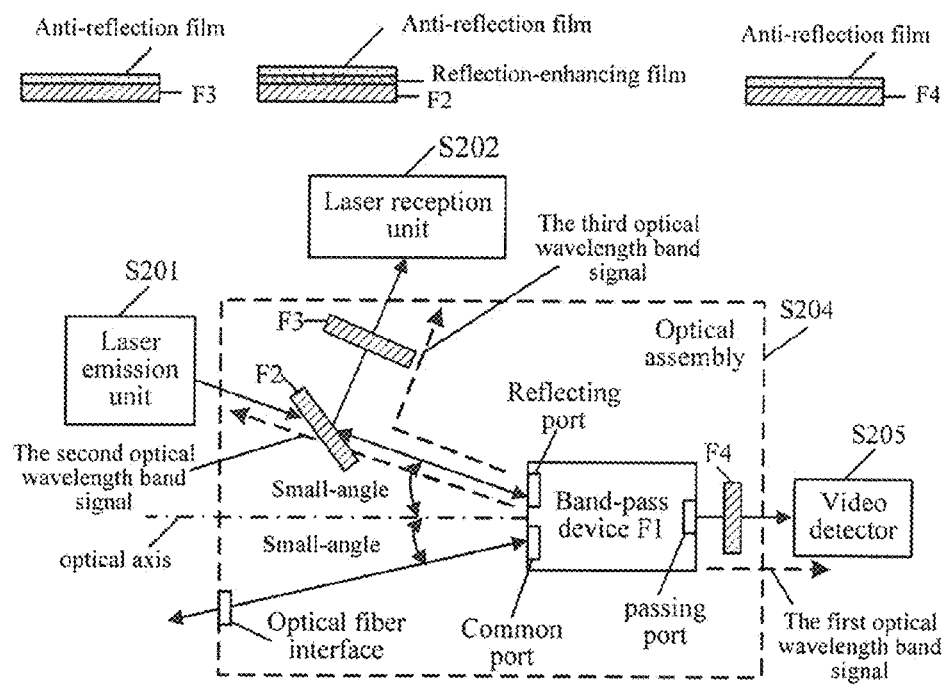
FIG. 2 is a schematic diagram of an internal structure of an optical module according to an embodiment of the disclosure.

FIG. 2 illustrates an internal structure of an optical module according to an embodiment of the disclosure, which includes a laser emission unit 201, a laser reception unit 202, an optical assembly 204, a video detector 205 and a Micro-programmed Control Unit (MCU) (not illustrated).

The laser emission unit 201, the laser reception unit 202, the MCU unit and the video detector 205 may be embodied respectively as (but will not be limited to) circuits of a laser emission unit, a laser reception unit, an MCU unit and a video detector as common in the optical module in the prior art.

The laser emission unit 201 is configured to convert a data electric signal input to the optical module into an uplink optical data signal and then emit the uplink optical data signal; and The uplink optical data signal emitted by the laser emission unit 201 is coupled by the optical assembly 204 into an optical fiber connected with an optical fiber interface of the optical module and passed over the optical fiber.

A downlink optical data signal and a radio frequency signal transported to the optical module over the optical fiber are emitted into the optical assembly 204 via the optical fiber interface of the optical module and separated by the optical assembly 204 and then emitted respectively into the laser reception unit 202 and the video detector 205.

The laser reception unit 202 is configured to receive the downlink optical data signal separated by the optical assembly 204 and to convert the downlink optical data signal into a corresponding data electric signal and then output the data electric signal.

The video detector 205 is configured to receive the radio frequency signal separated by the optical assembly 204 and to convert the radio frequency signal into an electric signal and process and then output the electric signal.

The MCU connected with the laser reception unit 202, the laser emission unit 201 and the video detector 205 is configured to control the laser reception unit 202, the laser emission unit 201 and the video detector 205 or to receive parameters from the laser reception unit 202, the laser emission unit 201 and the video detector 205. The MCU can further communicate with a system device external to the optical module, receive an instruction and perform an operation or return a corresponding parameter in response to the received instruction.

The optical assembly 204 may include a band-pass device F1 arranged with a small-angle incidence filter sheet and a filter sheet F2; and The band-pass device F1 may include three ports which are a common port (COM), a passing port (Pass) and a reflection port (Reflect) respectively.

The common port of the band-pass device F1 is connected with the optical fiber as the optical fiber interface of the optical module, and optical signals are transported to the band-pass device F1 via the common port over the optical fiber, where the optical signal in a first optical wavelength band is passed by the small-angle incidence filter sheet and output via the passing port of the band-pass device F1; and the optical signals in other bands are reflected by the small-angle incidence filter sheet and output via the reflection port of the band-pass device F1.

Where the optical wavelength band of the radio frequency signal is located in the first optical wavelength band, and the optical wavelength bands of the uplink optical data signal and the downlink optical data signal are located out of the first optical wavelength band, that is, the first optical wavelength band includes the optical wavelength band of the radio frequency signal but does not include the optical wavelength bands of the uplink optical data signal and the downlink optical data signal.

Figure 3:
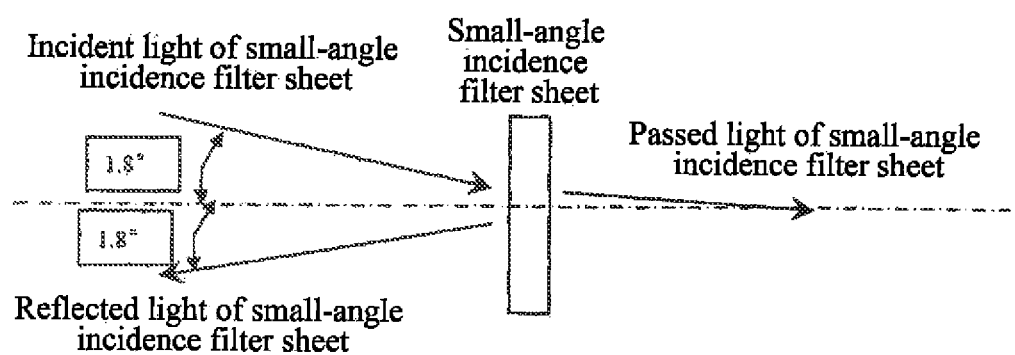
FIG. 3 is a schematic diagram of an operating principle of a band-pass device F1 according to an embodiment of the disclosure.

FIG. 3 illustrates a schematic diagram of an operating principle of the small-angle incidence filter sheet in the band-pass device F1, where the optical signal input via the common port of the band-pass device F1, i.e., incident light of the small-angle incidence filter sheet, is incident upon the small-angle incidence filter sheet at a small angle (e.g., 1.8°) to the optical axis of the small-angle incidence filter sheet. The small-angle incidence filter sheet with a band-passing function passes only the optical signal in the first optical wavelength band as passed light of the small-angle incidence filter sheet while the optical signals at the other wavelengths are reflected by the small-angle incidence filter sheet as reflected light of the small-angle incidence filter sheet. The passed optical signal in the first optical wavelength band is output via the passing port of the band-pass device F1, and the reflected optical signals are output via the reflection port of the band-pass device F1. The band-pass device F1 arranged with the small-angle incidence filter sheet thus separates the optical signal in the first optical wavelength band from the optical signals in the other optical wavelength bands.

The small-angle incidence filter sheet may be configured with an anti-reflection film for the first optical wavelength band to pass the optical signal in the first optical wavelength band while reflecting the optical signals in other bands to thereby separate the radio frequency signal from the optical signals in other bands. For example, for a radio frequency signal at 1550 to 1560 nm, the small-angle incidence filter sheet is configured with an anti-reflection film at 1550 to 1560 nm with a 30 dB lower cutoff wavelength thereof controlled at 1545 nm and a 30 dB upper cutoff wavelength thereof controlled at 1565 nm while reflecting at the other wavelengths.

The angle between the incident light of the small-angle incidence filter sheet and the optical axis of the small-angle incidence filter sheet may be between 1° to 5° and may be preferably 1.8°.

The filter sheet F2 may be arranged between the reflection port of the band-pass device F1 and the laser emission unit 201 at a 45° angle to a first optical path which is an optical path over which the optical signal emitted via the reflection port of the band-pass device F1 is transmitted straight and also an optical path of an optical signal incident into the reflection port of the band-pass device F1.

The filter sheet F2 may be configured with an anti-reflection film for a second optical wavelength band and an anti-reflection film for a third optical wavelength band, where the second optical wavelength band is the optical wavelength band of the uplink optical data signal, and the third optical wavelength band is the optical wavelength band of the downlink optical data signal. The filter sheet F2 is configured to pass the uplink optical data signal and to reflect the downlink optical data signal, for example, the filter sheet F2 may pass the optical signal in the second optical wavelength band emitted by the laser emission unit to the reflection port of the band-pass device F1 and reflect the optical signal in the third optical wavelength band among the optical signals output via the reflection port of the band-pass device F1 to the laser reception unit.

That is, the uplink optical data signal in the second optical wavelength band emitted by the laser emission unit 201 is passed by the filter sheet F2, emitted into the band-pass device F1 via the reflection port of the band-pass device F1, reflected by the small-angle incidence filter sheet in the band-pass device F1 and output to the optical fiber via the common port of the band-pass device F1 for transmission.

The downlink optical data signal in the third optical wavelength band among the optical signals reflected via the reflection port of the band-pass device F1 is reflected by the filter sheet the band-pass device F1 and emitted at a 90° angle to its original optical path into the laser reception unit 202; and a photo diode in the laser reception unit 202 configured to receive an detect the optical signal in the third optical wavelength band may be arranged on a second optical path which is an optical path over which the downlink optical data signal (i.e., the optical signal in the third optical wavelength band) reflected by the filter sheet F2 is transmitted straight; and the downlink optical data signal emitted via the reflection port of the band-pass device F1 is reflected by the filter sheet F2 into the laser reception unit 202 over the second optical path. The laser reception unit 202 receives the optical signal in the third optical wavelength band reflected by the filter sheet F2 and then converts the received optical signal into a corresponding electric signal for output.

Furthermore the optical assembly 204 may further include a filter sheet F3 and a filter sheet F4.

The filter sheet F3 may be arranged between the filter sheet F2 and the laser reception unit 202 perpendicular to the second optical path; and the filter sheet F3 is configured with a reflection-enhancing film in the third optical wavelength band so that an optical signal at another wavelength may be prevented from entering the laser reception unit 202 to thereby improve the degree of isolation over the optical path.

The filter sheet F4 may be arranged between the passing port of the band-pass device F1 and the video detector 205 perpendicular to the third optical path which is an optical path over which the laser emitted via the passing port of the band-pass device F1 is transmitted straight. The filter sheet F4 is configured with a pass-enhance film in a fourth optical wavelength band so that an optical signal at another wave may be prevented from entering the video detector 205. The fourth optical wavelength band is the optical wavelength band of the radio frequency signal and located in or the same as the first optical wavelength band, that is, the first optical wavelength band above may be the same as the fourth optical wavelength band or may be slightly wider than the fourth optical wavelength band.

Figure 4:
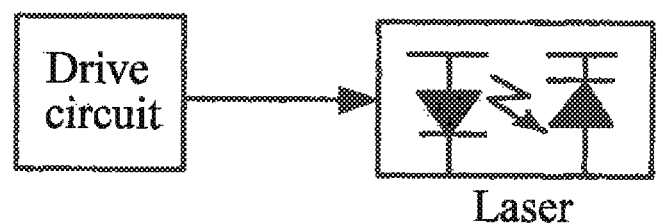
FIG. 4 is an internal circuit block diagram of a laser emission unit according to an embodiment of the disclosure.

FIG. 4 illustrates an internal circuit of the laser emission unit 201, including a laser and a drive circuit thereof. The drive circuit of the laser emission unit 201 receives the data electric signal and then drives a laser emission optical source in the laser by the received data electric signal the laser in the second optical wavelength band as the uplink optical data signal, for example, the drive circuit may be a directly-modulated laser driver, and the laser may be a Distributed Feedback Laser (DFB); or the drive circuit may be an externally-modulated laser driver, and the laser may be an Electrically-absorbed Modulated Laser (EML).

Figure 5:
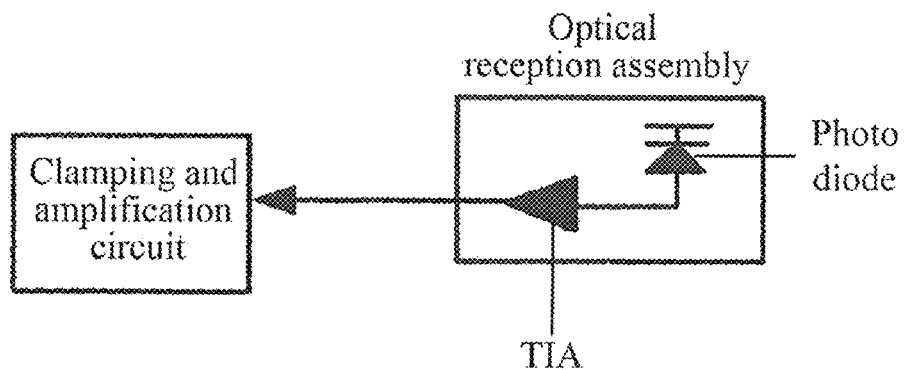
FIG. 5 is an internal circuit block diagram of a laser reception unit according to an embodiment of the disclosure.

FIG. 5 illustrates the laser reception unit 202 in one or more embodiment of this disclosure, including an optical reception assembly and a clamping and amplification circuit; and the optical reception assembly may include a photo diode and a Trans-Impedance Amplifier (TIA). The photo diode outputs corresponding response current to the TIA upon detection of the downlink optical data signal, and then the TIA outputs a corresponding differential electric signal which is fed to the clamping and amplification circuit, and the clamping and amplification circuit clamps and amplifies the differential signal and outputs the corresponding data electric signal. The electric signal output by the clamping and amplification circuit is typically a differential electric signal. For example, the photo diode in the laser reception unit 202 may be an Avalanche Photo Diode (APD).

Figure 6:
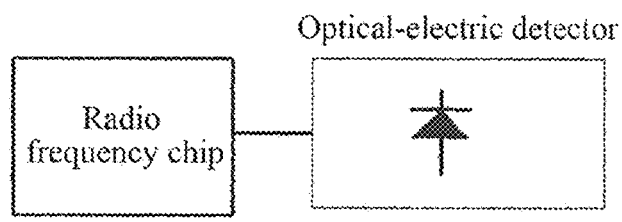
FIG. 6 is an internal circuit block diagram of a video detector according to an embodiment of the disclosure.

FIG. 6 illustrates an video detector 205 in one or more embodiment of this disclosure, including an optical-electric detector and a radio frequency chip, where the optical-electric detector converts the radio frequency signal into an electric signal and then transmits the electric signal to the radio frequency chip upon detection of the radio frequency signal; and the radio frequency chip processes and then outputs the received electric signal.

Figure 7A:
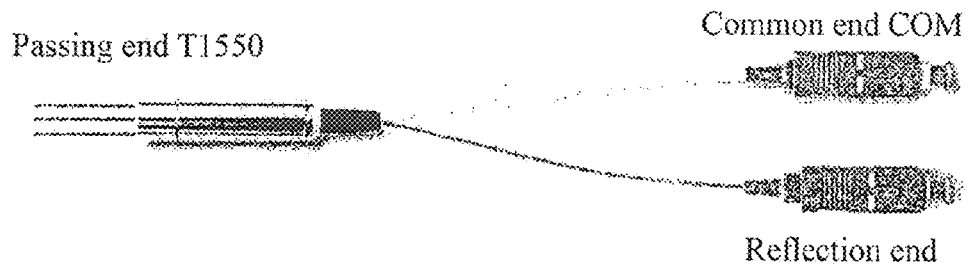
FIG. 7a is a physical diagram of an FWDM device applied in an embodiment of the disclosure.

The band-pass device F1 may be a thin Film Wave Division Multiplexing (FWDM) device as illustrated in FIG. 7a or may be a Planar Lightwave Circuit (PLC) device to separate the radio frequency signal from the data signal. arrangement of the small-angle incidence filter sheet in the FWDM or the PLC may be well known to those skilled in the art, so a repeated description thereof will be omitted here.

In one or more embodiment of this disclosure, packaging of the optical assembly, the filter sheet F2 and the filter sheet F3, the laser in the laser emission unit 201 and the optical reception assembly in the laser reception unit 202 may be packaged in a Bidirectional Optical Subassembly Assembly (BOSH).

Figure 7B:
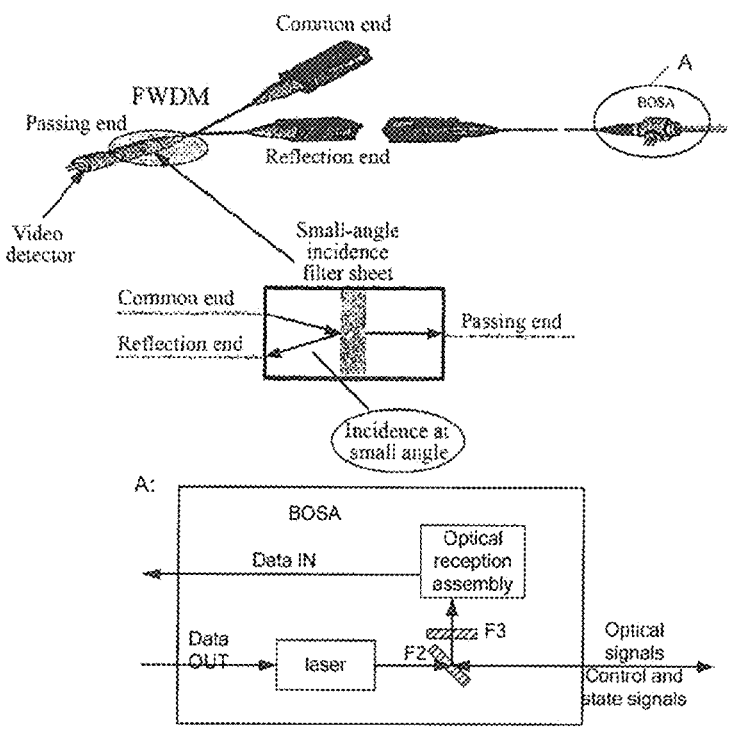
FIG. 7b is a schematic diagram of an FWDM device according to an embodiment of the disclosure applied to an optical module.

FIG. 7b illustrates the FWDM arranged with the small-angle incidence filter sheet in the optical module in one or more embodiment of this disclosure, where the reflection end of the FWDM is in communication with an optical fiber interface of the BOSA in the optical module over the optical fiber, the small-angle incidence filter sheet is located in proximity to the passing end of the FWDM, the common end of the FWDM is used as the optical fiber interface of the optical module, and the passing end of the FWDM is integrated with the video detector 205 to output directly the processed radio frequency electric signal.

In one or more embodiment of this disclosure packaging of the optical assembly, the band-pass device F1, the filter sheet F2, the filter sheet F3 and the filter sheet F4, the laser, the optical reception assembly and the video detector 205 are packaged in the same optical device.

Figure 8:
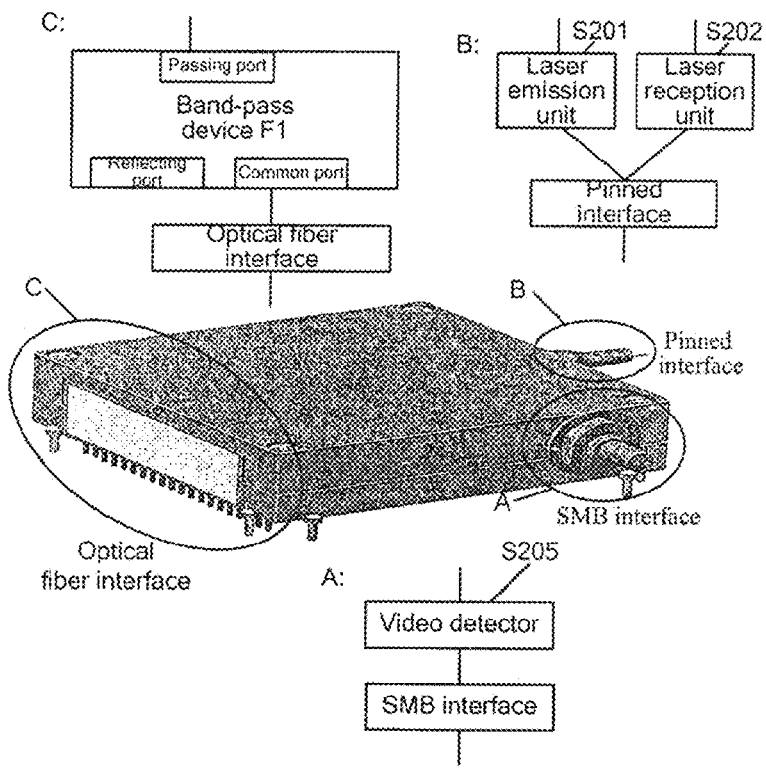
FIG. 8 is an external diagram of a package of an optical module according to an embodiment of the disclosure.

FIG. 8 illustrates the packaged optical module in one or more embodiment of this disclosure, where interfaces of the packaged optical module to the outside may include an optical fiber interface, a pinned interface, a Small Maintained assembly B (SMB) interface (a radio frequency connection head).

The optical fiber interface of the optical module is configured to connect to the optical fiber and to receive the optical signals transmitted over the optical fiber and emit them into the optical module via the optical fiber interface of the optical module; and the optical signals emitted by the optical module are transmitted to the optical fiber via the optical fiber interface.

The SMB interface of the optical module is configured to output the electric signal output by the video detector 205.

The pinned interface of the optical module is configured to output the data electric signal output by the laser reception unit 202, to receive the data electric signal transported to the laser emission unit 201 and to transmit other control and state signals.

In one or more embodiment of this disclosure, definitions of respective pines in the pinned interface of the optical module are listed in Table 1 below.

TABLE 1

| pin | Symbol | Description |
| --- | --- | --- |
| 1 | GND | Case Ground |
| 2 | $V_{EER}$ | Receiver Ground |
| 3 | $V_{CCR}$ | Receiver 3.3 V DC Supply |
| 4 | Rx_SD | Receiver Signal Detect |
| 5 | Rx_DATA(+) | Rx_Data Output (Non Inverted) |
| 6 | Rx_DATA(−) | Rx_Data Output (Inverted) |
| 7 | Tx_BEN(+) | Transmitter Burst Mode Enable Non Inverted LVPECL Input |
| 8 | Tx_BEN(−) | Transmitter Burst Mode Enable Inverted LVPECL Input |
| 9 | $V_{EET}$ | Transmitter Ground |
| 10 | Tx_DATA(+) | Transmitter Tx DATA Non-Inverted LVPECL Input |
| 11 | $V_{EET}$ | Transmitter Ground |
| 12 | Tx_DATA(−) | Transmitter Tx DATA Inverted LVPECL Input |
| 13 | $V_{CCT}$ | Transmitter 3.3 V DC Supply |
| 14 | SDA | I²C Serial Data I/O |
| 15 | SCL | I²C Serial Clock |
| 16 | TX_indication | Tx transmitter State indication, Asserts high When Transmitter ON |
| 17 | $V_{DD}$ | Video 12 V DC Supply |
| 18 | NC | Not Connected. |
| 19 | Reset | Reset input, Low for reset, High for normal Option 2: |
| 20 | GND | Case Ground |
| 21 | RF GND | RF Ground |
| 22 | RF OUT | RF Output |
| 23 | RF GND | RF Ground |

If the optical module according to this disclosure is applied to the NG-PON2 system, then the second optical wavelength band above may be an optical wavelength band at 1530 to 1540 nm, and the third optical wavelength band may be an optical wavelength band at 1595 to 1625 nm. The optical module according to this disclosure may be an ONU optical module.

Since the band-pass/band-stop device in the optical module according to one or more embodiment of this disclosure may separate a narrow-band optical signal from full-band optical signals, the radio frequency signal and the data signal in the closely spaced bands may be separated so that the optical module may be applicable to an optical access network system with a data signal in a wavelength band spaced far from the wavelength band of a radio frequency signal but also to an optical access network system with a data signal in a wavelength band spaced close to the wavelength band of a radio frequency signal, and thus the optical module may be applied to a larger number of optical access network system and may be more widely applicable.

Those ordinarily skilled in the art can appreciate that all or a part of the steps in the method according to the embodiments above may be performed by program instructing relevant hardware, where the program may be stored in a computer readable storage medium, e.g., an ROM/RAM, a magnetic disk, an optical disk, etc.

The foregoing discourse is merely illustrative of preferred embodiments of this disclosure, and it shall be noted that those ordinarily skilled in the art can further make several improvements and modifications thereto without departing from the principle of this disclosure and these improvements and modifications shall also be construed as falling into the scope of this disclosure.

The invention claimed is:

1. An optical module, comprising: a laser emission unit, a laser reception unit and a video detector, wherein the optical module further comprises an optical assembly comprising:
    a band-pass device F1 arranged with a small-angle incidence filter sheet, the band-pass device F1 comprising a common port, a passing port and a reflection port, wherein among optical signals transmitted to the band-pass device F1 via the common port over an optical fiber connected with the optical module, an optical signal in a first optical wavelength band is passed by the small-angle incidence filter sheet and then output to the video detector via the passing port; and the optical signals in other bands are reflected at the small-angle by the small-angle incidence filter sheet and then output via the reflection port; where the small-angel refers to the angle between an incident light of the small-angle incidence filter sheet and an optical axis of the small-angle incidence filter sheet; and
    a filter sheet F2 configured to pass the optical signal in a second optical wavelength band emitted by the laser emission unit to the reflection port of the band-pass device F1 and to reflect the optical signal in a third optical wavelength band among the optical signals output via the reflection port of the band-pass device F1 to the laser reception unit, wherein
    the band-pass device F1 is further configured to reflect the optical signal in the second optical wavelength band at the small-angle, emitted into the reflection port thereof, to the common port thereof through the small-angle incidence filter sheet and to output the optical signal to the optical fiber via the common port thereof; and
    the second optical wavelength band is an optical wavelength band of an uplink optical data signal emitted by the optical module, the third optical wavelength band is an optical wavelength band of a downlink optical data signal received by the optical module, and the first optical wavelength band includes the optical wavelength band of a radio frequency signal received by the optical module but does not include the optical wavelength bands of the uplink optical data signal and the downlink optical data signal.

2. The optical module according to claim 1, wherein the filter sheet F2 is configured with an anti-reflection film for the second optical wavelength band and a reflection-enhancing film in the third optical wavelength band; and
    the filter sheet F2 is arranged between the reflection port of the band-pass device F1 and the laser emission unit at a 45° angle to a first optical path, and a photo diode in the laser emission unit is arranged on a second optical path; and
    wherein the first optical path is an optical path over which the optical signal emitted via the reflection port of the band-pass device F1 is transmitted straight, and the second optical path is an optical path over which the optical signal in the third optical wavelength band reflected by the filter sheet F2 is transmitted straight.

3. The optical module according to claim 2, wherein the optical assembly further comprises:
    a filter sheet F3 with an anti-reflection film for the third optical wavelength band, arranged between the filter sheet F2 and the laser reception unit; and
    a filter sheet F4 with an anti-reflection film for a fourth optical wavelength band, arranged between the passing port of the hand-pass device F2 and the video detector, wherein the fourth optical wavelength band is the optical wavelength band of the radio frequency signal and located in the first optical wavelength band, or the first optical wavelength band is the same as the fourth optical wavelength band.

4. The optical module according to claim 3, wherein:
    the filter sheet F2, the filter sheet F3, a laser in the laser emission unit and an optical reception assembly in the laser reception unit are packaged in a Bidirectional Optical Subassembly Assembly (BOSA); or
    the band-pass device F1, the filter sheet F2, the filter sheet F3 and the filter sheet 14, the laser, the optical reception assembly and the video detector are packaged in the same optical device.

5. The optical module according to claim 4, wherein the optical reception assembly comprises a photo diode and a Trans-Impendence Amplifier (TIA).

6. The optical module according to claim 5, wherein the photo diode is an Avalanche Photo Diode (APD).

7. The optical module according to claim 1, wherein the small-angle incidence filter sheet is configured with an anti-reflection film for the first optical wavelength band, and the band-pass device F1 is a thin Film Wavelength Division Multiplexing (FWDM) device; and
    the optical signals transmitted to the band-pass device F1 via the common port are incident upon the small-angle incidence filter sheet at an angle of 1° to 5°.

8. The optical module according to claim 1, wherein the laser emission unit comprises a laser and a drive circuit thereof, and the laser is a Distributed Feedback Laser (DFB) or an Electrically-absorbed Modulated Laser (EML).

9. The optical module according to claim 1, wherein the laser reception unit comprises an optical reception assembly and a clamping and amplification circuit.

10. The optical module according to claim 1, wherein the optical module is an Optical Network Unit (ONU) optical module applicable to an NG-PON2, Gigabit Passive Optical Network (GPON) or Ethernet Passive Optical Network (EPON) system.

11. The optical module according to claim 1, wherein interfaces of the optical module comprise:
    an optical fiber interface configured to connect to the optical fiber;
    an SMB interface configured to output an electric signal output by the video detector; and
    a pinned interface configured to output a data electric signal output by the laser reception unit, to receive a data electric signal transported to the laser emission unit and to transmit other control and state signals.

12. An optical device applicable to an optical module, comprising:
    a hand-pass device F1 arranged with a small-angle incidence filter sheet, comprising a common port, a passing port and a reflection port, wherein among optical signals transmitted to the band-pass device F1 via the common port over an optical fiber connected with the optical module, the optical signal in a first optical wavelength hand is passed by the small-angle incidence filter sheet and then output to a video detector via a passing port in the optical module; and the optical signals in other bands are reflected at the small-angle by the small-angle incidence filter sheet and then output via the reflection port; where the small-angle refers to the angle between an incident light of the small-angle incidence filter sheet and an optical axis of the small-angle incidence filter sheet;

a filter sheet F2 configured to pass the optical signal in a second optical wavelength band emitted by a laser emission unit in the optical module to the reflection port of the band-pass device F1 and to reflect the optical signal in a third optical wavelength band among the optical signals output via the reflection port of the band-pass device F1 to a laser reception unit in the optical module; and the band-pass device F1 is further configured to reflect the optical signal in the second optical wavelength band at the small-angle, emitted into the reflection port thereof, to the common port thereof through the small-angle incidence filter sheet and to output the optical signal to the optical fiber via the common port thereof.

13. The optical device according to claim 12, further comprising:
a filter sheet F3 with an anti-reflection film for the third optical wavelength band, arranged between the filter sheet F2 and the laser reception unit; and
a filter sheet F4 with an anti-reflection film for a fourth optical wavelength band, arranged between the passing port of the band-pass device F1 and the video detector, wherein the fourth optical wavelength band is the optical wavelength band of the radio frequency signal and located in the first optical wavelength band, or the first optical wavelength band is the same as the fourth optical wavelength band; and wherein the second optical wavelength band is an optical wavelength band of an uplink optical data signal emitted by the optical module, the third optical wavelength band is an optical wavelength band of a downlink optical data signal received by the optical module, and the first optical wavelength band includes the optical wavelength band of a radio frequency signal received by the optical module but does not include the optical wavelength bands of the uplink optical data signal and the downlink optical data signal; and the fourth optical wavelength band is the optical wavelength band of the radio frequency signal.

14. The optical device according to claim 13, wherein the small-angle incidence filter sheet is configured with an anti-reflection film for the first optical wavelength band, and the band-pass device F1 is a thin Film Wavelength Division Multiplexing (FWDM) device; and
the optical signals transmitted to the band-pass device F1 via the common port are incident upon the small-angle incidence filter sheet at an angle of 1° to 5°.

* * * * *